March 18, 1958 A. J. GRANBERG ET AL 2,827,314
SELF-SEALING WEAR-COMPENSATING PACKING GLAND
Filed May 3, 1952
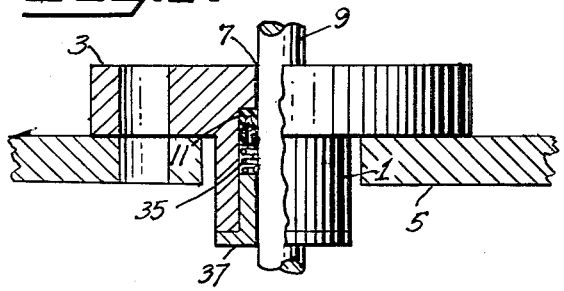
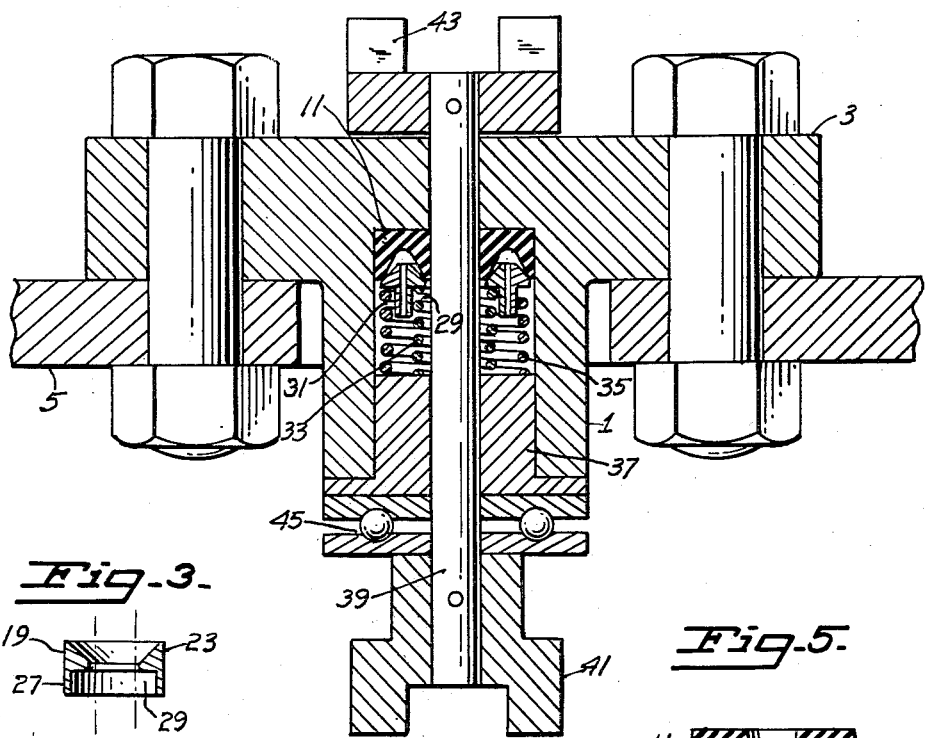
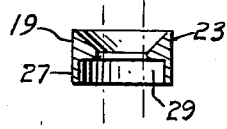
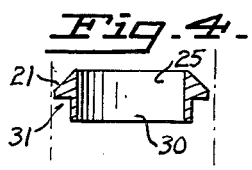
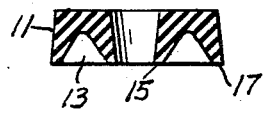
INVENTORS
ALBERT J. GRANBERG
LAWRENCE T. ROSSI
BY
Bruce & Brosler
THEIR ATTORNEYS 2,827,314

SELF-SEALING WEAR-COMPENSATING PACKING GLAND

Albert J. Granberg, Oakland, and Lawrence T. Rossi, Albany, Calif.; said Rossi assignor to Granberg Corporation, Oakland, Calif., a corporation of California Application May 3, 1952, Serial No. 285,964

4 Claims. (Cl. 286—26)

Our invention relates to devices having one or more shafts extending therefrom which require sealing to preclude leakage of liquid around such shafts, and more particularly relates to packing glands for such purposes.

Among the objects of our invention are:

(1) To provide a novel and improved packing gland;

(2) To provide a novel and improved packing gland which will self-compensate for expansion or contraction due to temperature effects;

(3) To provide a novel and improved packing gland which will not distort in use and permit leakage;

(4) To provide a novel and improved packing gland which will be self-sealing and possess the ability to compensate for wear while in use;

(5) To provide a novel and improved packing gland of simple construction and one which may be readily assembled.

Additional objects of our invention will be brought out in the following description of a preferred embodiment of the same, taken in conjunction with the accompanying drawings wherein—

Figure 1 is a view partly in section of a packing gland of the present invention as applied to a device employing a rotating shaft;

Figure 2 is a view in section illustrating the invention as applied in conjunction with a thrust bearing, to a gear shaft in a high pressure meter for measuring gasoline or other volatile liquids;

Figures 3 and 4 are views in section of wedge elements employed in the packing gland of Figures 1 and 2;

Figure 5 is a view in section of the sealing ring constituting an important component of the packing gland of Figures 1 and 2.

Referring to the drawings for details of our invention in its preferred form, the same comprises a cylindrical housing 1 having a bolt flange 3 at one end for attachment to the wall 5 of a casing of some device to which it is to be assembled. The flanged end is closed except for an axial shaft opening 7 for a cylindrical shaft 9 to be sealed, while the opposite end of the housing is open for assembling of the packing elements of the gland.

Disposed in the housing against the flanged end is a ring 11 of resilient material. While said ring, in its unstressed condition, may be cylindrical and provide a close fit with both the shaft and housing, we prefer to have it slightly tapered with its inner end having an inside diameter slightly greater than that of the shaft, and an outside diameter slightly less than the housing diameter, and with its exposed end having an inside diameter slightly less than that of the shaft and an outside diameter slightly greater than the housing diameter. In either case, the ring is of a size to provide a snug fit in said housing and about said shaft.

In the exposed end of the ring, facing the open end of the housing, there is formed a circular recess or trough 13 of U-shaped section resulting in a circular inner lip 15 and a circular outer lip 17. The sloping surface of each lip makes an acute angle with its associated outer ring surface.

When assembled in the housing, as shown, a squeeze occurs about the lip end of the ring which will serve to bulge the other end into contact with both the shaft and housing wall.

Where the packing gland is to be employed in devices connected with the handling of gasoline or other petroleum products, the ring material is preferably of an artificial rubber such as "neoprene," or a plastic known in the trade as "Teflon," since both of these materials function well as sealing material and are practically immune to gasoline and related products.

Into the circular recess of the sealing ring, are inserted a pair of circular wedges 19 and 21, one having a cylindrical outer surface 23 and the other a cylindrical inner surface 25. These are disposed back to back with respect to each other.

The inside diameter of the wedge 19 is slightly greater than that of said resilient ring to avoid contact with the shaft when in operating position, and depending from said wedge is a cylindrical apron 27 which defines with the shaft, a cylindrical chamber 29.

The outer diameter of the other of said wedges is made slightly less than the inside diameter of said housing and like the first wedge, is provided with a depending cylindrical apron 30, which in this instance, forms a cylindrical chamber 31 with the inside wall of the housing.

The foregoing wedges are designed to a shallow taper with respect to the trough section, whereby upward pressure exerted by each wedge will have the effect of increasing the lip pressure against the adjacent surface of the housing or shaft, as the case may be, to increase the sealing effect between them.

The cylindrical chambers 29 and 31, formed by the depending aprons, are each adapted to house a compression spring 33 and 35 respectively, and these are held under compression by a nut 37 or other element, which serves at the same time, as a closure to close the open end of the packing gland housing about the shaft which passes therethrough. Such closure may be threaded into the housing or provided with a flange for bolting the same to the open end of the housing.

Inasmuch as the outer lip is of greater linear dimension than the inner lip, the outer spring should preferably be of a somewhat heavier rating.

With the coil springs maintained under continual compression, it will be apparent that the wedges are continually functioning to spread the lips of the resilient sealing ring. Being that such lips are tapered, greater flexing tends to occur at the edges of the lips and consequently, a ring of concentrated pressure exists along each lip to maintain said lips in sealing engagement with both the inner wall of the housing and the shaft passing through the housing. Such sealing pressure engagement, furthermore, will be maintained despite wear on the sealing ring due to the rotation of the shaft, and despite any tendency of the components to expand or contract in response to temperature changes to which the components may be exposed. In other words, the packing gland described is self-sealing and wear-compensating.

The continual pressure of the wedges, furthermore, serves to prevent distortion of the sealing ring from any cause, such as might occur with changes in temperature, or sometimes when the sealing ring is exposed to liquids of different character, such as is found in gasolines of different grades and qualities.

Such prevention of distortion is very important in connection with systems related to the flow of gasoline or other petroleum products, in that previous attempts to utilize a similar sealing ring have not met with complete success, due to the fact that any tendency to expand or contract often resulted in the lips of the ring curling or corrugating and thus permitting leakage. This has been finally eliminated through the application of the wedges in the manner indicated.

In an application of the invention to a situation where thrust loads must be taken into consideration, as illustrated in Figure 2, the above described packing gland lends itself very effectively.

In the particular situation illustrated, a shaft 39 passes through the packing gland and is to be sealed thereby against leakage. This shaft connects the last gear 41 of a gear train in a liquid meter with the initial gear 43 of a gear train in a counter mechanism mounted on the top of the meter and externally thereof. To take care of the thrust existing in such installation against the lower end of the packing gland, a thrust bearing 45 preferably of the ball bearing type, is disposed about the shaft between the packing gland closure 37 and the gear 41, and thus not only is the thrust adequately taken care of, but the shaft connecting the two gear trains will be effectively sealed against leakage.

It will be apparent from the above disclosure of our invention that the same fulfills all the objects attributable thereto, and while we have disclosed our invention in considerable detail, the same is subject to alteration and modification without departing from the underlying principles involved, and we accordingly do not desire to be limited in our protection to the specific details illustrated and described, except as may be necessitated by the appended claims.

We claim:

1. A packing gland assembly comprising a cylindrical housing having an open end, and a closed end with a shaft passage therein, a shaft extending through said housing, a ring of resilient material in said housing and about said shaft, said ring having at its exposed end, a circular outer lip snugly fitting said housing and a circular inner lip snugly fitting said shaft, resilient pressure developing means directed outwardly against the outer of said lips to the exclusion of the inner lip, said means including an outwardly directed circular wedge having an outside diameter slightly less than the diameter of said outer lip and disposed in said housing with a sloping wedge surface contacting said outer lip, and a compression spring surrounding said shaft and in pressure engagement against said outwardly directed wedge, resilient pressure developing means directed inwardly against said inner lip to the exclusion of said outer lip, said means including an inwardly directed circular wedge having an inside diameter slightly greater than the diameter of said inner lip and disposed within said outwardly directed circular wedge, with a sloping wedge surface contacting said inner lip, and a compression spring about said shaft within said first compression spring and in pressure engagement against said inwardly directed circular wedge.

2. A packing gland assembly comprising a cylindrical housing having an open end, and a closed end with a shaft passage therein, a shaft extending through said housing, a ring of resilient material in said housing and about said shaft, said ring having at its exposed end, a circular outer lip having an inner edge and snugly fitting said housing and a circular inner lip having an outer edge and snugly fitting shaft, resilient pressure developing means directed outwardly against the outer of said lips to the exclusion of the inner lip, said means including an outwardly directed circular wedge having an outside diameter slightly less than the diameter of said outer lip and disposed in said housing with a sloping wedge surface contacting the inner edge of said outer lip, and a compression spring surrounding said shaft and in pressure engagement against said outwardly directed wedge, resilient pressure developing means directed inwardly against said inner lip to the exclusion of said outer lip, said means including an inwardly directed circular wedge having an inside diameter slightly greater than the diameter of said inner lip and disposed within said outwardly directed circular wedge, with a sloping wedge surface contacting the outer edge of said inner lip, and a compression spring about said shaft within said first compression spring and in pressure engagement against said inwardly directed circular wedge.

3. A packing gland assembly comprising a cylindrical housing having an open end, and a closed end with a shaft passage therein, a shaft extending through said housing, a ring of resilient material in said housing and about said shaft, said ring having at its exposed end a circular outer lip snugly fitting said housing and a circular inner lip snugly fitting said shaft, said ring being slightly tapered along its outer surface from its lip end and reversely tapered along its inner surface, resilient pressure developing means directed outwardly against the outer of said lips to the exclusion of the inner lip, said means including an outwardly directed circular wedge having an outside diameter slightly less than the diameter of said outer lip and disposed in said housing with a sloping wedge surface contacting said outer lip, and a compression spring surrounding said shaft and in pressure engagement against said outwardly directed wedge, resilient pressure developing means directed inwardly against said inner lip to the exclusion of said outer lips, said means including an inwardly directed circular wedge having an inside diameter slightly greater than the diameter of said inner lip and disposed within said outwardly directed circular wedge with a sloping wedge surface contacting said inner lip, and a compression spring about said shaft within said first compression spring and in pressure engagement against said inwardly directed circular wedge, whereby each wedge is movable independently of the other.

4. A seal packing for use in sealing a space between a shaft member and a housing member, comprising: an annular sealing ring in said space having an inner skirt and an outer skirt each disposed at an obtuse angle respectively to said members with extremities of the skirts being adapted for sealing contact with the respective members; a first male adapter ring having an angularly disposed surface facing the outer skirt and contacting the skirt only at the extremity thereof, said first ring being movable axially of the shaft toward the outer skirt to force and move said extremity both axially and radially into contact with one of said members; a second male adapter ring having an angularly disposed surface facing the inner skirt and contacting the skirt only at the extremity thereof, said second ring being movable axially of the shaft toward the inner skirt to force and move said extremity both axially and radially into contact with the other of said members; and independent means yieldingly urging each adapter ring axially toward the packing.

References Cited in the file of this patent

UNITED STATES PATENTS

| | | |
|---|---|---|
| 1,829,451 | McNab | Oct. 27, 1931 |
| 2,071,204 | Hunt | Feb. 16, 1937 |
| 2,415,887 | Joy | Feb. 18, 1947 |
| 2,546,961 | Amero | Apr. 3, 1951 |
| 2,705,177 | Waring | Mar. 29, 1955 |

FOREIGN PATENTS

| | | |
|---|---|---|
| 183,522 | Switzerland | June 16, 1936 |
| 251,406 | Germany | Oct. 3, 1912 |
| 323,365 | Great Britain | Jan. 2, 1930 |
| 534,923 | Great Britain | Mar. 21, 1941 |
| 618,970 | Great Britain | Mar. 2, 1949 |